United States Patent
Ishida et al.

(10) Patent No.: US 10,726,402 B2
(45) Date of Patent: Jul. 28, 2020

(54) ACCOUNT DATA MANAGEMENT SYSTEM

(71) Applicant: Nomura Research Institute, Ltd., Tokyo (JP)

(72) Inventors: Yuzo Ishida, Tokyo (JP); Hiroo Yoshida, Tokyo (JP); Masaki Soga, Tokyo (JP); Shunsuke Murakami, Tokyo (JP); Masakuni Negishi, Tokyo (JP)

(73) Assignee: NOMURA RESEARCH INSTITUTE, LTD., Tokyo (JP)

( * ) Notice: Subject to any disclaimer, the term of this patent is extended or adjusted under 35 U.S.C. 154(b) by 267 days.

(21) Appl. No.: 15/563,369

(22) PCT Filed: Mar. 30, 2015

(86) PCT No.: PCT/JP2015/059906
§ 371 (c)(1),
(2) Date: Sep. 29, 2017

(87) PCT Pub. No.: WO2016/157359
PCT Pub. Date: Oct. 6, 2016

(65) Prior Publication Data
US 2018/0082271 A1 Mar. 22, 2018

(51) Int. Cl.
*G06Q 20/10* (2012.01)
*G06Q 40/02* (2012.01)
*H04L 29/06* (2006.01)

(52) U.S. Cl.
CPC ......... *G06Q 20/1085* (2013.01); *G06Q 40/02* (2013.01); *H04L 67/42* (2013.01)

(58) Field of Classification Search
CPC ................................................. G06Q 20/1085
See application file for complete search history.

(56) References Cited

U.S. PATENT DOCUMENTS

| | | | |
|---|---|---|---|
| 7,571,116 B1* | 8/2009 | Stout | G06Q 30/06 705/26.35 |
| 2001/0037300 A1* | 11/2001 | Miyazaki | G06Q 20/10 705/43 |

(Continued)

FOREIGN PATENT DOCUMENTS

| | | |
|---|---|---|
| JP | 10-40118 A | 2/1998 |
| JP | 11-161530 A | 6/1999 |

(Continued)

OTHER PUBLICATIONS

International Search Report dated May 19, 2015, issued in counterpart International Application No. PCT/JP2015/059906 (2 pages).

(Continued)

*Primary Examiner* — Scott C Anderson
(74) *Attorney, Agent, or Firm* — Westerman, Hattori, Daniels & Adrian, LLP

(57) ABSTRACT

Provided are a withdrawal management DB server, a deposit management DB server, and an AP sewer. The withdrawal management DB server includes a withdrawal table, a remittance table, a withdrawal/remittance table, and a remittance completion table. The deposit management DB sewer includes a deposit table, a remittance reception table, and a deposit/remittance table. The AP server registers withdrawal data related to an account number on the withdrawing side to the withdrawal table, registers a remittance ID to the remittance table, and registers a withdrawal ID and the remittance ID to the withdrawal/remittance table in remittance processing. The AP server registers deposit data related to an account number of a withdrawing destination to the deposit table, registers the remittance ID to the remittance reception table, and registers a deposit ID and the remittance ID to the deposit/remittance table. The AP server (Continued)

registers the remittance ID to the remittance completion table.

4 Claims, 4 Drawing Sheets

(56) References Cited

U.S. PATENT DOCUMENTS

| | | | |
|---|---|---|---|
| 2005/0246250 A1* | 11/2005 | Murray | G06Q 30/04 705/30 |
| 2007/0124242 A1 | 5/2007 | Reis, Jr. | |
| 2013/0151387 A1* | 6/2013 | Ohkubo | G06Q 40/02 705/35 |

FOREIGN PATENT DOCUMENTS

| | | |
|---|---|---|
| JP | 2002-324022 A | 11/2002 |
| JP | 2003-58717 A | 2/2003 |
| JP | 2013-250623 A | 12/2013 |

OTHER PUBLICATIONS

Introduction to quickly mastered SQL & T-SQL (12), Internet URL: http://www.atmarkit.co.jp/ait/articles/0803/24/news138.html, released at midnight of Mar. 24, 2008, w/English translation (5 pages).

* cited by examiner

[FIG. 1]
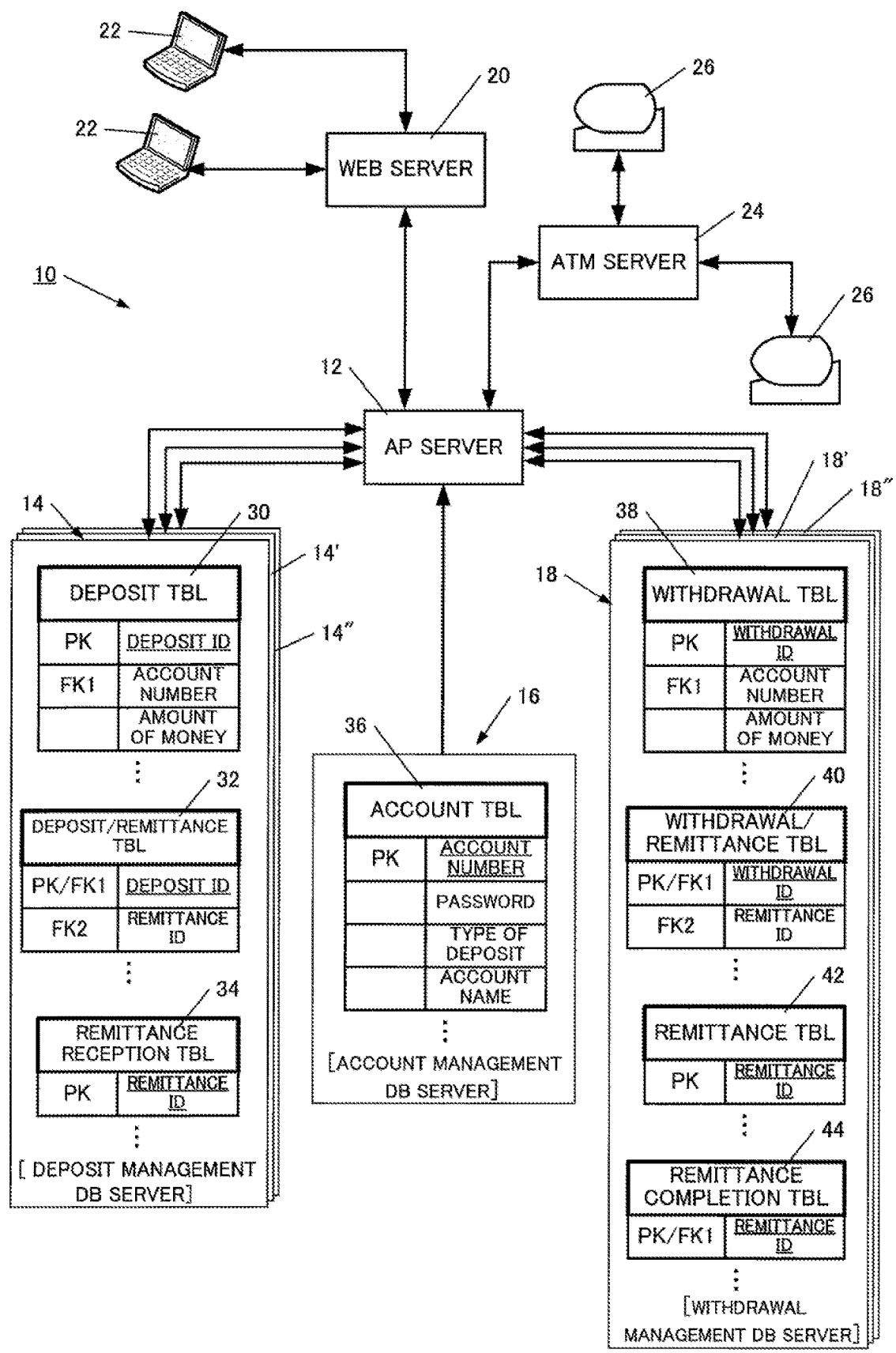

[FIG. 2]
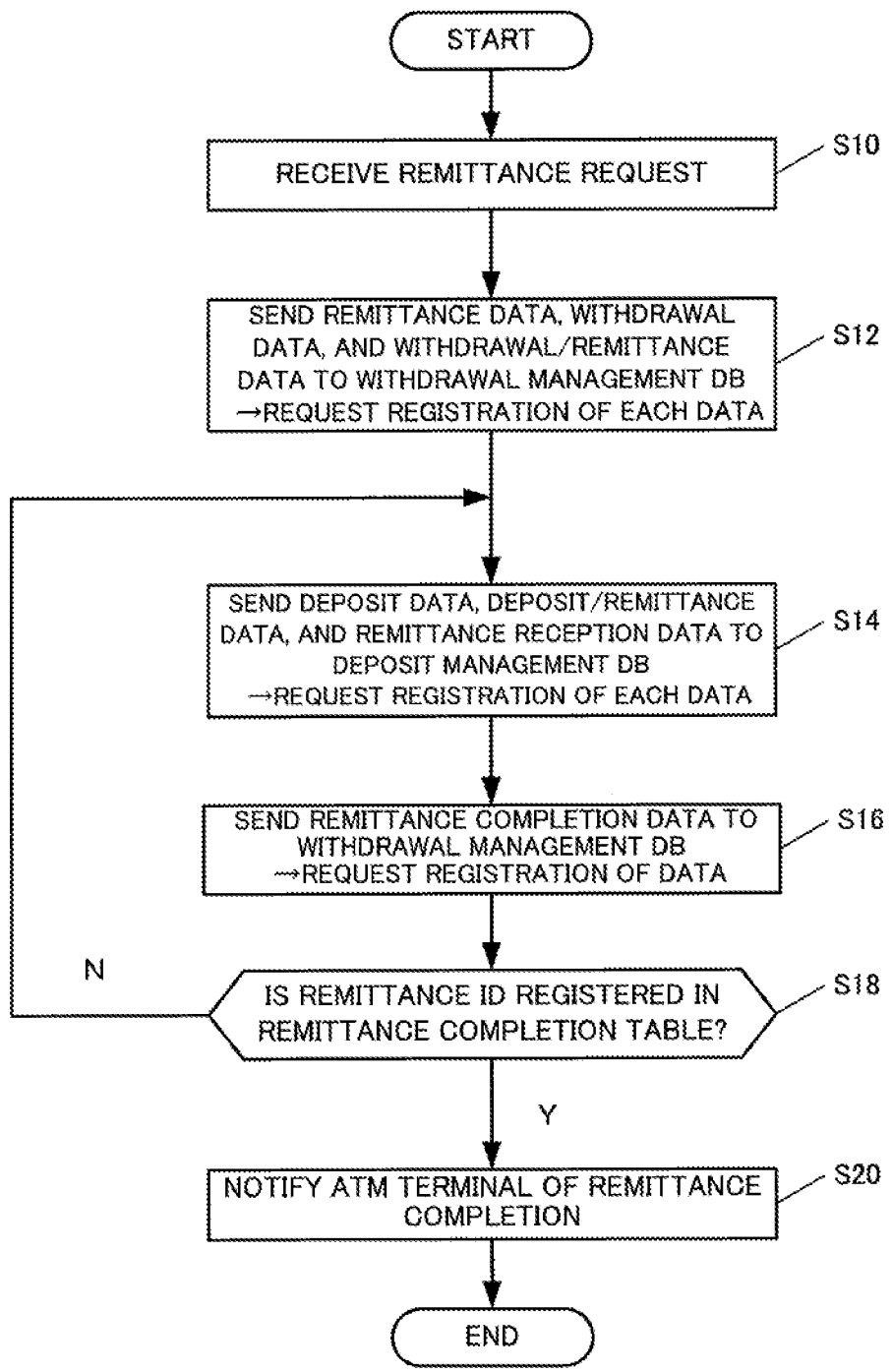

[FIG. 3]
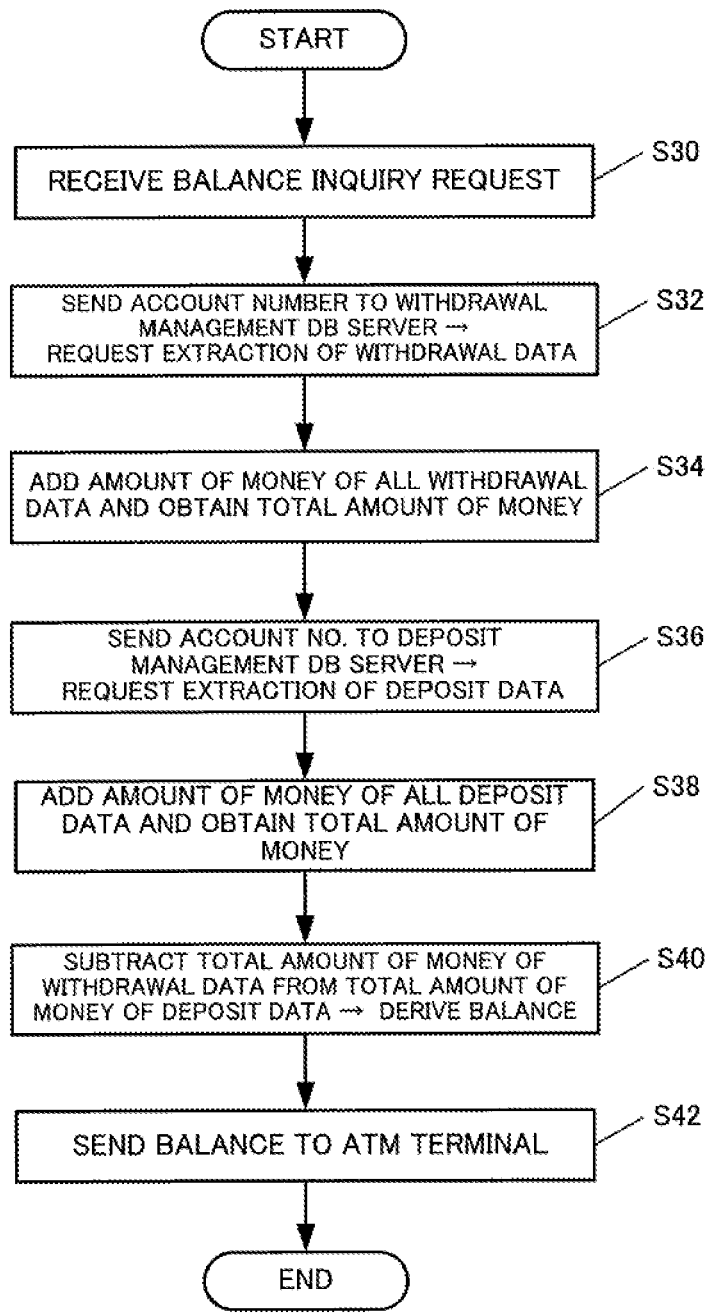

[FIG. 4]
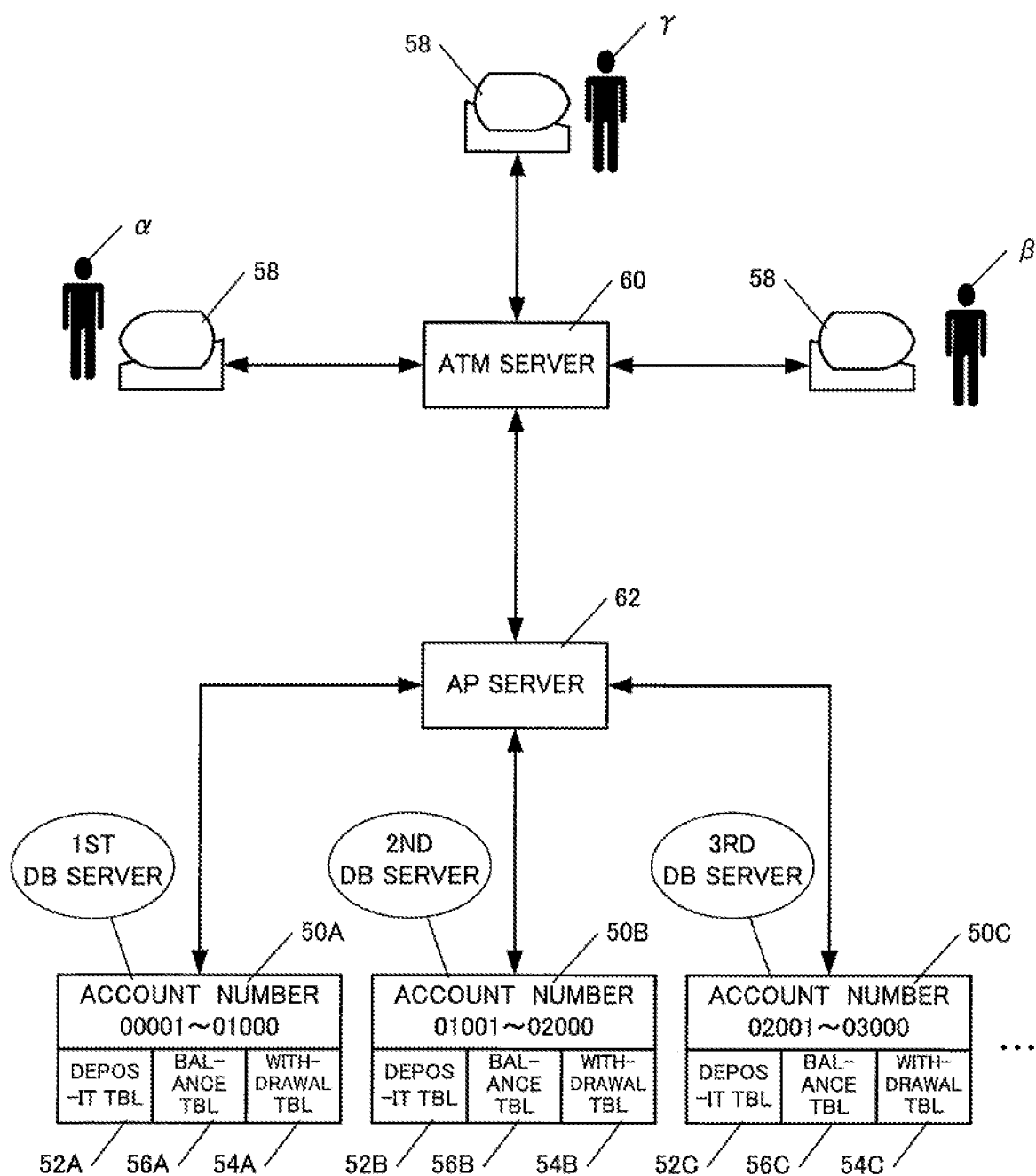

ACCOUNT DATA MANAGEMENT SYSTEM

FIELD OF THE INVENTION

The invention relates to an account data management system, in particular, relates to a data processing system associated with deposit or withdrawal, remittance, and balance inquiry with respect to an account of a bank or the like.

DESCRIPTION OF THE RELATED ART

A financial institution such as a bank has previously managed deposit of a client linked to an account number. However, recently, in order to flexibly cope with the increase in number of accounts, account data is managed with distribution to a plurality of databases in a group unit of a constant number of accounts.

FIG. 4 shows an example of the distribution management, account numbers are assigned to separate DB servers 50 on the unit basis of 1,000 account numbers, each having a deposit table 52, a withdrawal table 54, and a balance table 56.

Here, e.g., a user α of account number: 00001 accesses an AP server 62 from an ATM terminal 58 via an ATM server 60 to request deposit processing of 10,000 yen to a self-account. The AP server 62 requests registration of deposit data to a first DB server 50A that manages data of the user α.

In response to this, the first DB server 50A stores deposit data, corresponding to a specified amount of money to a deposit table 52A.

Subsequently, the AP server 62 requests the first DB server 50A to update balance data. The first DB server 50A having received this executes update processing to add 10,000 yen to the balance of the user α stored in a balance table 56A.

Further, a user β of account number: 01001 accesses the AP server 62 from the ATM terminal 58 via the ATM server 60, and requests withdrawal processing of 10,000 yen from a self-account. The AP server 62 requests registration of withdrawal data to a second DB server SOB that manages data of the user β.

In response to this, the second DB server SOB stores withdrawal data corresponding to a specified amount of money to a withdrawal table 54B.

Subsequently, the AP server 62 requests the second DB server 50B to update balance data. The second DB server SOB having received this executes update processing to subtract 10,000 yen from the balance of the user β stored in a balance table 56B.

Furthermore, a user γ of account number: 02001 accesses the AP server 62 from the ATM terminal 58 via the ATM server 60, and requests balance inquiry processing to a self-account. The AP server 62 requests balance inquiry to a third DB server 50C that manages data of the user γ.

In response to this, the third DB server 50C sends the balance data of the user γ at the current timing stored in a balance table 56C to the AP server 62.

The balance data is sent to the ATM terminal 58 via the ATM server 60, and is displayed on a display.

SUMMARY OF THE INVENTION

Problems to be Solved by the Invention

As mentioned above, data management is assigned to a different DB server 50 on the basis of a group unit of account numbers, thereby enabling load distribution on the DB server 50 side.

Further, also in a case where the account number is increased, addition of the new DB server 50 enables easy scale-out.

Further, even if a fault is generated in any of the DB servers 50, an account belonging to a part of groups is limitedly influenced. There is an advantage for continuing general services to an account other than that.

However, in a case where remittance processing of 10,000 yen is performed from the user α to the user β, withdrawal data corresponding to 10,000 yen is registered to the withdrawal table 54A of the user α stored in the first DB server 50A. Simultaneously, such complicated processing that takes a long time has to be executed that deposit data corresponding to 10,000 yen is registered to the deposit table 52B of the user β stored in the second DB server 50B, the completion of both processing is checked, and data in the balance table 56A of the user α and the balance table 56B of the user β is thereafter updated.

Further, if a fault is generated in the middle in any of the DB servers 50, the AP server 60 needs to execute roll-back for cancelling all processing and returning to the original state (refer to Non Patent Literature 1).

Non Patent Literature 1: SQL&T-SQL Guidance (12) for easy learning Internet URL:

www.atmarkit.co.jp/ait/articles/0803/24/news138.html
Search date: 26th, February, 2015

This invention is devised in consideration of the current situations, and has an object to accomplish the realization of distribution on the DB server side with respect to management of account data and simultaneously simplification of remittance processing across accounts.

Means for Solving the Problem

In order to accomplish the object, an account data management system according to claim 1 includes a withdrawal management DB server, a deposit management DB server, an AP server, and a terminal device operated by a user, wherein the withdrawal management DB server includes a withdrawal table that stores withdrawal data including a withdrawal ID, an account number, and a withdrawal amount, a remittance table that stores remittance data including a remittance ID, a withdrawal/remittance table that stores withdrawal/remittance data showing a correspondence relation between the remittance ID and the withdrawal ID, and a remittance completion table that stores remittance completion data including the remittance ID, the deposit management DB server includes a deposit table that stores deposit data including a deposit ID, an account number, and a deposit amount, a remittance reception table that stores remittance reception data including a remittance ID, and a deposit/remittance table that stores deposit/remittance data showing a correspondence relation between the remittance ID and the deposit ID, when a remittance request with an account number of a user, an amount of money, and an account number of a remittance destination is sent from the terminal device, the AP server requests the withdrawal management DB server, to additionally register withdrawal data related to the account number of the user to the withdrawal table, additionally register remittance data including a unique remittance ID to the remittance table, and additionally register withdrawal/remittance data to the withdrawal/remittance table, when a registration completion notification is sent from the withdrawal management DB server, the AP server requests the deposit management DB server, to additionally register deposit data related to an account number of a transfer destination to the deposit table, additionally register remittance reception data to the remittance reception table, and additionally register deposit/remittance data including the deposit ID and remittance ID to the deposit/remittance table, and when the registration completion notification is sent from the deposit management DB server, the AP server requests the withdrawal management DB server to additionally register remittance completion data to the remittance completion table.

An account data management system according to claim 2 is the system of claim 1, and further, when a balance related to a specific account number is referred to, the AP server executes processes of: obtaining withdrawal data related to the account number from the withdrawal table; calculating a sum of withdrawal amounts by adding an amount of each withdrawal data; obtaining deposit data related to the account number from the deposit table; calculating a sum of deposit amounts by adding an amount of each deposit data; and deriving the balance of the account number by subtracting the sum of withdrawal amount from the sum of deposit amount.

An account data management system according to claim 3 is the system of claim 1 or 2, and further, the AP server resends corresponding deposit data, remittance reception data, and deposit/remittance data of the remittance data stored in the remittance table whose remittance ID is not registered in the remittance completion table, to the deposit management DB server, to request additional registration to each table.

An account data management system according to claim 4 is the system according to claims 1 to 3, and further, the AP server has a plurality of withdrawal management DB servers connected thereto, requests all withdrawal management DB servers to additionally register the same data when registering data to the withdrawal management DB server, and requests an arbitrary DB server to send necessary data when referring data, and the AP server has a plurality of deposit management DB servers connected thereto, requests all deposit management DB servers to additionally register the same data when registering data to the deposit management DB server, and requests an arbitrary DB server to send necessary data when referring data.

An account data management, system according to claim 5 is the system according to claim 4, and further, a limitation for permitting only addition of data and prohibiting deletion and update of data is imposed to each table in the withdrawal management DB server and each table in the deposit management DB server.

Effects of the Invention

In the case of the account data management system according to claim 1, a storage destination of data related to account management is divided into the withdrawal management DB server and the deposit management DB server, and therefore the load on the DB server side can be distributed into two systems.

Further, the AP server registers withdrawal data, remittance data, and withdrawal/remittance data to the withdrawal management DB server. Thereafter, the deposit management DB server registers the deposit data, the remittance reception data, and the deposit/remittance data. Thereafter, the withdrawal management DB server registers the remittance completion data. Thereby, it is possible to effectively realize remittance processing across the accounts while dividing the DB servers into two systems for deposit management and withdrawal management.

With the account data management system according to claim 2, the sum of withdrawal amounts is subtracted from the sum of deposit amounts, and thereby it becomes possible to derive a balance of each account with calculation, and becomes unnecessary to provide a table dedicated for balance management.

With the account data management system according to claim 3, in a remittance case wherein the remittance ID is not registered in the remittance completion table, the AP server resends a pair of deposit data or the like to the deposit management DB server. Therefore, in the remittance processing, the remaining is effectively prevented only with registration of the withdrawal data. As a consequence, the matching of data can be kept.

With the account data management system according to claim 4, a plurality of the withdrawal management DB servers is prepared, and common data is overlappingly stored therein. Further, a plurality of the deposit management DB servers is also prepared and a system for overlappingly storing common data is provided, and therefore it is possible to improve maintainability of data.

Furthermore, in reference to data, the AP server can obtain data from an arbitrary one of a plurality of the DB servers, and therefore it is possible to distribute the load on the DB server side.

With the account data management system according to claim 5, as a result of simplification of processing contents on the DB server side, it is possible to improve the response performance.

Further, at the time of fault occurrence, it is possible to restore data simply by only copying shortage data from another DB server.

BEST MODE FOR CARRYING OUT THE INVENTION

FIG. 1 shows the whole configuration of an account data management system 10 according to the invention. An AP server 12, a deposit management DB server 14, an account management DB server 16, and a withdrawal management DB server server 18 are provided.

A plurality of client terminals 22 including a PC or the like is connected to the AP server 12 via a Web server 20.

Further, a plurality of ATM terminals 26 is connected to the AP server 12 via an ATM server 24.

Although not shown in the drawings, in the AP server 12, the load distribution is performed by multiplication via a load balancer.

At least a deposit table 30, a deposit/remittance table 32, and a remittance reception table 34 are provided to the deposit management DB server 14.

Records having data items such as deposit ID, an account, number, and an amount of money are stored in the deposit table 30.

Further, records having data items such as a deposit ID and a remittance ID are stored in the deposit/remittance table 32.

Records having data items such as a remittance ID are stored in the remittance reception table 34.

At least an account table 36 is provided in the account management DB server 16.

Records having data items such as an account number, a password, a deposit, type, and an account name are stored in the account, table 36.

At least a withdrawal table 38, a withdrawal/remittance table 40, a remittance table 42, and a remittance completion table 44 are provided in the withdrawal management DB server 18.

Records having data items such as a withdrawal ID, an account number, and an amount of money are stored in the withdrawal table 38.

Further, records having data items such as a withdrawal ID and a remittance ID are stored in the withdrawal/remittance table 40.

Records having data items such as a remittance ID are stored in the remittance table 42.

Records having data items such as a remittance ID are stored in the remittance completion table 44.

As the deposit management DB server 14, a plurality of DB servers 14', 14", . . . including the same tables (deposit table 30, deposit/remittance table 32, and remittance reception table 34) is provided. The same data is simultaneously sent to each DB server 14 from the AP server 12, and additional registration to each table is overlappingly executed.

Further, also as the withdrawal management DB server 18, a plurality of DB server 18', 18", . . . including the same tables (withdrawal table 38, withdrawal/remittance table 40, remittance table 42, and remittance completion table 44) is prepared. The same data is simultaneously sent to the each DB server 18 from the AP server 12. Additional registration to each table is overlappingly executed.

As mentioned above, a plurality of the deposit, management DB servers 14 and a plurality of the withdrawal management DB servers 18 which store the same data, respectively, are prepared. Therefore, the AP server 12 can freely read data from any of the DB servers at reference time of data, thus promoting efficiency of data reference processing.

Further, arranging a part of the DB servers having the same contents at a remote area makes it possible to prepare for a large-scale disaster such as earthquake.

Further, such a limitation that only the addition and reference of data are permitted and update and deletion of data are prohibited is preset to the deposit management DB server 14 and the withdrawal management DB server 18.

That is, as a general DB server, if update or deletion of data is admitted, when a fault is generated in a part of the DB servers, in order to restore the data, addition, deletion, and update of data need to be sequentially reproduced from a constant, timing based on an update log held by the DB server. Not only this takes a long time but also it is necessary to provide a mechanism for certainly storing the update log on the DB server side.

On the other hand, if only the "addition" is permitted in case of registering data, the data is compared with data that is registered in another DB server that is normally operated and the difference is simply copied, thereby following the data. Therefore, the storage of the update log is not necessary and the time to the recovery can be extremely reduced.

Further, since the recovery of the data is easy as above, when the same data is overlappingly stored to a plurality of the DB servers, it is not necessary to follow a troublesome adjusting system called "two-phase commitment" between the DB servers. When the additional registration of the same data is simply requested to each DB server and the completion notification is returned from each DB server, the data can be read (so-called realization of auto-commitment).

A user of a bank operates the ATM terminal 26 or the client terminal 22, thereby depositing cash to a self-account or withdrawing cash from the self-account.

For example, when the user selects "deposit" from the service menu displayed on the display of the ATM terminal 26, thereafter inserts a cash card, and inputs password of the account, both the account number and the password are sent to the AP server 12 via the ATM server 24.

The AP server 12 having received this refers to the account table 36 of the account management DB server 16, and checks the validity of the corresponding account number and password.

Subsequently, when the user inputs cash to the ATM terminal 26, the deposit amount is sent from the ATM terminal 26 to the AP server 12.

The AP server 12 having received this sends deposit data (deposit ID, account number, amount of money, etc.) to the deposit management DB server 14.

The deposit management DB server 14 additionally registers the deposit data to the deposit table 30.

Further, when the user selects "withdraw" from the service menu and specifies the amount of money, a withdrawal amount is sent to the AP server 12 via the ATM server 24.

The AP server 12 having received this first calculates the balance of the account (a method for calculating the balance will be described later).

Then, when the balance is over the withdrawal amount, data for instructing cash payment is sent to the ATM terminal 26. Further, corresponding withdrawal data (withdrawal ID, account number, amount of money, etc.) is generated, and is sent to the withdrawal management DB server 18.

The withdrawal management DB server 18 additionally registers the withdrawal data to the withdrawal table 38.

The user also can access the AP server 12 from the client terminal 22 placed at home or a working place via the Web server 20, and perform the deposit or withdrawal (charge) by using an electronic money card.

Subsequently, a description will be given of a remittance method between accounts using the system 10 in accordance with a flowchart in FIG. 2.

First, after the user selects "transfer" from the service menu displayed on the display of the ATM terminal 26, when the amount of money is specified and the transfer destination account number is specified, remittance request data is sent to the AP server 12 via the ATM server 24. The sending request data includes the account number of the user, the account number of the transfer destination, and the amount of money.

The AP server 12 having received this (S10) generates a unique remittance ID and withdrawal ID and generates remittance data (remittance ID, or the like), withdrawal data (withdrawal ID, account number of the user, the amount of money, or the like), and withdrawal/remittance data (withdrawal ID, remittance ID, or the like), sends these to the withdrawal management DB server 18, and requests registration of these to the remittance table 42, the withdrawal table 38, and the withdrawal/remittance table 40 (S12).

The withdrawal management DB server 13 having received this collectively adds the remittance data, the withdrawal data, and the withdrawal/remittance data as one transaction to the remittance table 42, the withdrawal table 38, and the withdrawal/remittance table 40.

The AP server 12 having received the registration completion notification to each table from the withdrawal management DB server 18 generates a unique deposit ID, further generates remittance reception data (remittance ID or the like), deposit data (deposit ID, account number of transfer destination, amount of money or the like), and deposit/remittance data (deposit ID, remittance ID, or the like), sends the data to the deposit management DB server 14 to request the registration to the remittance reception table 34, the deposit table 30, and the deposit/remittance table 32 (S14).

The deposit management DB server 14 having received this collectively adds the remittance reception data, the deposit data, and the deposit/remittance data as one transaction to the remittance reception table 34, the deposit table 30, and the deposit/remittance table 32.

The AP server 12 having received the registration completion notification from the deposit management DB server 14 sends remittance completion data (remittance ID, or the like) to the withdrawal management DB server 13, and requests the registration to the remittance completion table (S16).

When remittance ID is registered to the remittance completion table, a series of remittance processing is safely completed. Therefore, the AP server 12 periodically checks the remittance table 42 and the remittance completion table 44. When the remittance table 42 includes remittance processing in which the remittance ID is not registered (S18/N), deposit data, deposit/remittance data, and remittance reception data are resent to the deposit management DB server 14 (S14).

When a first request has not reached by some reason, the deposit management DB server 14 completes collective addition of each data again based on the resent registration request, and thereafter sends the registration completion notification to the AP server 12.

On the other hand, when additional registration of each data is completed based on the first request but the registration completion notification has not reached the AP server 12 by a communication failure or the like, the deposit management DB server 14 resends the registration completion notification based on a registration request after the second or subsequent time without overlappingly registering the data.

This is realized based on the original function of the DB server for automatically excluding the overlapped registration of data with the same ID.

That is, as "deposit ID" being a primary key of the deposit data and the deposit/remittance data, new ID is delivered each time the deposit data is resent. However, the first "remittance ID" is filled to the primary key of the remittance reception data. Therefore, the remittance ID is checked, and the DB server thus can prevent the overlapping registration of data.

The AP server 12 having received the registration completion notification from the deposit management DB server 14 sends the remittance completion data to the withdrawal management DB server 18, and requests the registration to the remittance completion table (S16).

The AP server 12 having checked that the corresponding remittance ID is registered to the remittance completion table 44 (S18/Y) notifies the ATM terminal 26 of remittance completion via the ATM server 24 (S20).

Note that, when the remittance ID is not registered to the remittance completion table 44 even after repeating processing of S13→S14→S16 a constant number of times, the AP server 12 sends a message of time-out error to the ATM terminal 26.

Subsequently, a description will be given of a procedure of checking the balance of the account with the system 10 in accordance with a flowchart of FIG. 3.

First, when the user selects "balance inquiry" from the service menu displayed on the display of the ATM terminal 26, a balance inquiry request with an account number is sent to the AP server 12 via the ATM server 24.

The AP server 12 having received this (S30) sends the account number to the withdrawal management DB server 18, and requests extraction of the withdrawal data associated with the account number (S32).

Then, when corresponding withdrawal data is sent from the withdrawal management DB server 18, the AP server 12 adds the amount of money of each withdrawal data, and obtains the total amount of money (S34).

Subsequently, the AP server 12 sends the account number to the DB server 14 for managing the deposit, and requests the extraction of the deposit data related to the account number (S36).

Then, when the corresponding deposit data is sent from the deposit management DB server 14, the AP server 12 adds the amount of money of each deposit data, and obtains the total amount of money (S38).

Subsequently, the AP server 12 subtracts the total amount of money of the withdrawal data from the total amount of money of the deposit data, and thus derives the balance at the current timing (S40).

The balance data is sent to the ATM terminal 26 via the ATM server 24 (S42), and is displayed on the display.

In the above, a description will be given of the case of selecting the balance inquiry of the account by the user on the ATM terminal 26. However, even if checking the balance of the account as pre-processing of withdrawal or transfer, the AP server 12 calculates the balance of the account with the similar processing procedure.

As mentioned above, without providing the dedicated table for managing the balance of the account on the DB server side, a calculating method with calculation corresponding to necessity is used. Therefore, when performing the processing called remittance across the accounts, it is possible to separate withdrawal processing from the remittance source account from deposit processing to the remittance destination account.

That is, if the balance is managed by providing the balance table as in the conventional method, in the remittance processing, both the withdrawal from the remittance source account and the deposit to the remittance destination account are simultaneously performed. Both the results need to be reflected on the balance of both of them, Adjustment of timing (two-phase commitment) is inevitable between a plurality of the DB servers.

Further, if one of the processing fails by some chance, processing (roll back) for returning the state of each table to the original one is required.

Of course, if it is assumed that the balance is calculated with calculation each time necessity for checking the balance is generated, the increase of load on the AP server 12 side cannot be denied. As mentioned above, however, the AP server 12 is multiplexed via a load balancer or the AP server 12 is configured with a multi-cored server computer, and thus it can be handled.

Further, in the case of the system 10, as mentioned above, a limitation for prohibiting the deletion and update of records is imposed on the tables stored in the deposit management DB server 14 and the withdrawal management DB server 18. Since a mechanism to permit only addition and reference of records is used, advantageously, processing on the DB server side is made efficient.

With the system 10, in the remittance processing, slight time lag is inevitably caused between registration processing of data on the withdrawal side and registration processing of data on the deposit side. However, this can be at the level that does not matter in consideration of transaction situations.

Further, a mechanism is provided to resend deposit data, deposit/remittance data, and remittance reception data to the deposit management DB server 14 from the AP server 12 until the remittance ID is registered to the remittance completion table 44. As long as at least one of the plurality of the deposit management DB servers 14 and at least one of the plurality of withdrawal management DB servers 18 are operated, advantageously, the matching of data is thus kept.

Moreover, a data management function is divided into two of the deposit management DB server 14 and the withdrawal management DB server 18. Thus, it is possible to promote efficiency by the distribution processing.

Further, the deposit management DB server 14 and the withdrawal management DB server 18 are multiplexed by a plurality of the DB servers having the same table and the same data, respectively. Thus, the AP server 12 can simultaneously extract data in parallel from a plurality of the DB servers, and it is possible to further promote efficiency of the processing.

In the foregoing, an example of applying the system 10 to data management related to a bank deposit account has been shown. However, the present invention is not limited to this.

For example, it is considerable to apply the system 10 to the data management of the account that manages the point of the user.

In this case, exchange of reading may be used: the "deposit" is "point addition", the "withdrawal" is "point usage (application)", the "remittance" is "point transfer", "balance" is "point balance", "the amount of money" is "the number of points", and the "account number" is "account".

BRIEF DESCRIPTION OF DRAWINGS

FIG. 1 is a schematic diagram showing the whole configuration of an account data management system according to the invention.

FIG. 2 is a flowchart showing a procedure of remittance processing in the system.

FIG. 3 is a flowchart showing a processing procedure of balance inquiry processing.

FIG. 4 is a schematic diagram showing an example of a conventional account data managing method.

EXPLANATION OF REFERENCES

10: account data management system
12: AP server
14: deposit management DB server
16: account management DB server
18: withdrawal management DB server server
20: Web server
22: client terminal
22: client terminal
24: ATM server
26: ATM terminal
30: deposit table
32: deposit/remittance table
34: remittance reception table
36: account table
38: withdrawal table
40: withdrawal/remittance table
42: remittance table
44: remittance completion table

The invention claimed is:

1. An account information management system comprising a withdrawal management DB server, a deposit management DB server, an AP server, and a terminal device operated by a user, wherein the withdrawal management DB server includes a withdrawal table that stores withdrawal data including a withdrawal ID, an account number, and a withdrawal amount, a remittance table that stores remittance data including a remittance ID, a withdrawal/remittance table that stores withdrawal/remittance data showing a correspondence relation between the remittance ID and the withdrawal ID, and a remittance completion table that stores remittance completion data including the remittance ID, the deposit management DB server includes a deposit table that stores deposit data including a deposit ID, an account number, and a deposit amount, a remittance reception table that stores remittance reception data including a remittance ID, and a deposit/remittance table that stores deposit/remittance data showing a correspondence relation between the remittance ID and the deposit ID, when a remittance request with an account number of a user, an amount of money, and an account number of a remittance destination is sent from the terminal device, the AP server requests the withdrawal management DB server, to additionally register withdrawal data related to the account number of the user to the withdrawal table, additionally register remittance data including a unique remittance ID to the remittance table, and additionally register withdrawal/remittance data to the withdrawal/remittance table, when a registration completion notification is sent from the withdrawal management DB server, the AP server requests the deposit management DB server, to additionally register deposit data related to an account number of a transfer destination to the deposit table, additionally register remittance reception data to the remittance reception table, and additionally register deposit/remittance data including the deposit ID and remittance ID to the deposit/remittance table, and when the registration completion notification is sent from the deposit management DB server, the AP server requests the withdrawal management DB server to additionally register remittance completion data to the remittance completion table, wherein the AP server has a plurality of withdrawal management DB servers connected thereto, requests all withdrawal management DB servers to additionally register the same data when registering data to the withdrawal management DB server, and requests an arbitrary DB server to send necessary data when referring data, and the AP server has a plurality of deposit management DB servers connected thereto, requests all deposit management DB servers to additionally register the same data when registering data to the deposit management DB server, and requests an arbitrary DB server to send necessary data when referring data, wherein a limitation for permitting only addition of data and prohibiting deletion and update of data is preset to each table in the withdrawal management DB server and each table in the deposit management DB server, wherein the withdrawal management DB server, the deposit management DB server, and the AP server are separate computers, and wherein the AP server resends corresponding deposit data, remittance reception data, and deposit/remittance data of the remittance data stored in the remittance table whose remittance ID is not registered in the remittance completion table, to the deposit management DB server, to request additional registration to each table.

2. The account information management system according to claim 1, wherein when a balance related to a specific account number is referred to, the AP server executes processes of:

obtaining withdrawal data related to the account number from the withdrawal table;

calculating a sum of withdrawal amounts by adding an amount of each withdrawal data;

obtaining deposit data related to the account number from the deposit table;

calculating a sum of deposit amounts by adding an amount of each deposit data; and deriving the balance of the account number by subtracting the sum of withdrawal amount from the sum of deposit amount.

3. The account information management system according to claim 2, wherein the AP server has a plurality of withdrawal management DB servers connected thereto, requests all withdrawal management DB servers to additionally register the same data when registering data to the withdrawal management DB server, and requests an arbitrary DB server to send necessary data when referring data, and the AP server has a plurality of deposit management DB servers connected thereto, requests all deposit management DB servers to additionally register the same data when registering data to the deposit management DB server, and requests an arbitrary DB server to send necessary data when referring data.

4. The account information management system according to claim 1, wherein the AP server has a plurality of withdrawal management DB servers connected thereto, requests all withdrawal management DB servers to additionally register the same data when registering data to the withdrawal management DB server, and requests an arbitrary DB server to send necessary data when referring data, and the AP server has a plurality of deposit management DB servers connected thereto, requests all deposit management DB servers to additionally register the same data when registering data to the deposit management DB server, and requests an arbitrary DB server to send necessary data when referring data.

* * * * *